UNITED STATES PATENT OFFICE.

JOHN HOBBS, OF BOSTON, MASSACHUSETTS.

IMPROVEMENT IN TREATING ANIMAL FATS.

Specification forming part of Letters Patent No. 154,251, dated August 18, 1874; application filed June 5, 1874.

*To all whom it may concern:*

Be it known that I, JOHN HOBBS, of Boston, in the county of Suffolk and State of Massachusetts, have invented a new and Improved Cream-Suet Compound; and I do hereby declare that the following is a full, clear, and exact description of the same.

The invention relates to compounds used by bakers and cooks for shortening and enriching the flour or meal with which they make bread, cakes, and pastry.

Heretofore cheap butter and stearine have been employed for this purpose, and of late years several other compounds of the latter are the compounds made under Patents Nos. 110,626 and 137,564. These have fixed oil as a basis, and use tallow only in small proportions to give stiffness. The resultant in these cases, however, liquefies at the low temperature of 60° to 65°, and when hard is of a crumbling consistency, that does not admit of being cut without fracture. Compounds made under Patents Nos. 146,012 and 121,162 have been also somewhat used, but the alkali upon which they depend for effecting their combination, imparts an alkaline taste, to which there is very general objection.

My object in the present invention is to remedy these several objections, and to offer to the public a compound of a waxy consistency, that will always admit of a clean cut therethrough, will not liquefy under 85° to 95° Fahrenheit, and yet will be entirely without any alkaline ingredient.

In order to carry out my invention I make tallow the basis of my compound, and mix with cream, as follows: I take churned cream (with butter globules appearing) one part; molten tallow (pure) two parts. These are first are thoroughly intermixed, the plastic product next suffered to granulate and harden, and the resultant finally subjected to, preferably rotary, beaters, which whip the mass until it assumes a frothy appearance. After hardening, it may be manipulated or molded into any desired form, being of a waxy consistency, and possessing not only the susceptibility of a clean cut, but the property of non-liquefaction in a temperature less than from 85° to 95°.

By my process of incorporating tallow and the butter-globules, the former is enabled quickly to take up the margarine properties of the butter-globules as they form, which consist of glycerine, butyric, cupraic, capsylic, and capsic acids. These impart to the tallow a sweet and agreeable buttery smell and taste, and when thoroughly incorporated tend to soften the tallow so that it can be easily cut or manipulated.

In order to produce a thoroughly satisfactory result with tallow compounds, where the main object is to utilize the stearine, the proper preparation of the tallow becomes a very essential condition to success.

I grind the suet with granulated salt, which effectually breaks the animal tissues or cells, and retains the finely-ground suet at a temperature of at least 180° Fahrenheit in a waterbath. This separates the animal tissue.

In order to get rid of any impurities that remain, the molten tallow is drawn into a vessel kept at a temperature of about 160°, and subjected to an application of salt and albumen, in about the proportion of three pounds of fine salt and six ounces of dry-blood albumen to every one hundred pounds of suet.

After a few minutes agitation, and a subsequent rest, the undissolved salt will have gathered the more solid impurities and the albumen the lighter ones, while the former is precipitated and the latter caused to rise to the surface as a scum.

The melted tallow being now drawn off into a separate vessel, will be found almost entirely free from organic substances, and to exhibit a remarkable purity.

I do not claim, broadly, the extraction of oily and fatty matters from suets at a low temperature, nor the churning of such oily and fatty matters with milk or cream to make a product resembling butter.

Having thus described my invention, what I claim as new is—

1. The following process for giving a waxy consistency to compounds formed of cream and tallow, namely, by first intermixing the churned cream with melted tallow; secondly, allowing this to granulate; and, finally, whipping or beating the same until it assumes a frothy appearance, all as set forth.

2. The process of grinding tallow with granulated salt, to fracture and break up the animal tissues or cells of the former.

3. The process of removing impurities from melted tallow, by mixing therewith salt and albumen, the purified tallow being drawn off after agitation, and a subsequent rest.

JOHN HOBBS.

Witnesses:
SOLON C. KEMON,
CHAS. A. PETTIT.